United States Patent [19]

Ito et al.

[11] Patent Number: 5,489,253
[45] Date of Patent: Feb. 6, 1996

[54] LINEAR BEARING FOR HEAVY LOAD USE

[75] Inventors: Masao Ito, Kamakura; Takamasa Ohira, Hiratsuka; Kiyoshi Miki, Kanagawa, all of Japan

[73] Assignee: NSK Ltd., Tokyo, Japan

[21] Appl. No.: 328,918

[22] Filed: Oct. 25, 1994

[30] Foreign Application Priority Data

Oct. 28, 1993 [JP] Japan ........................................ 5-58497

[51] Int. Cl.$^6$ ..................................................... F16C 29/04
[52] U.S. Cl. ................................. 384/52; 384/51; 384/55
[58] Field of Search .................................. 384/50–56, 43, 384/44; 464/167, 168

[56] References Cited

U.S. PATENT DOCUMENTS

| 3,353,876 | 11/1967 | Moyer et al. ........................... 384/43 |
| 3,365,914 | 1/1968 | Asher ....................................... 464/167 |
| 3,490,251 | 1/1970 | Roethlisberger ..................... 464/168 X |
| 3,582,161 | 6/1971 | Hudson ..................................... 384/51 |

FOREIGN PATENT DOCUMENTS

| 1031490 | 6/1953 | France ..................................... 384/51 |
| 519866 | 4/1940 | United Kingdom . | |

Primary Examiner—Thomas R. Hannon
Attorney, Agent, or Firm—Shapiro and Shapiro

[57] ABSTRACT

The inner surface of an outer cylinder is made an outer cylinder raceway having a simple circular sectional configuration having a radius of curvature. On the outer circumference of an inner cylinder, a plurality of grooves having the radius of curvatures dimensioned equally to the aforesaid radius of curvature are arranged extendedly at the same pitch. The outer circumference of barrel shaped rollers inserted between the grooves and the inner surface of the outer cylinder is dimensioned equally to the aforesaid radius of curvature. The barrel shaped rollers and the inner and outer raceways constitute linear contacts, thus enhancing the ability of the load resistance to make it possible to prevent the peeling off, cracking, and other damages from taking place by the heavy load to be applied.

2 Claims, 4 Drawing Sheets

LINEAR BEARING FOR HEAVY LOAD USE

BACKGROUND OF THE INVENTION

1. Field of the Invention

The present invention relates to the improvement of a linear bearing for heavy load use suitably utilized for the bearing of a rolling mill or the like where a heavy load is to be applied, for example.

2. Related Background Art

As a conventional linear bearing of the kind for heavy load use, there have been known those disclosed in the specifications of British Patent No. 519,866, U.S. Pat. No. 3,353,876 among others. As a typical example, a bearing shown in FIG. 6 is known, for example. Generally, these bearings are such that as rolling elements, steel balls 3 are inserted between an outer cylinder 1 and an inner cylinder 2. On an inner surface 1a of the outer cylinder 1, a plurality of grooves 4 are formed extendedly in the axial direction with the curved surface having the same radius of curvature r dimensioned equally to the radius r of the steel balls 3. Also, on the surface 2a of the outer diameter of the inner cylinder 2, the grooves 5 having the curved surface of the radius of curvature r dimensioned equally to the radius r of the steel balls 3 are formed corresponding to the grooves 4 of the outer cylinder, respectively.

However, in the conventional linear bearings for heavy load use described above, it is required to precisely coincide the phase of the grooves 4 of the outer cylinder with the phase of the grooves 5 of the inner cylinder. Therefore, it is extremely difficult to machine them.

Also, each surface of the grooves 4 and 5 and the steel balls 3 constitute point contacts. As a result, when a heavy load is applied, the contact surface pressure becomes extremely great. A problem is thus encountered that the grooved surface may be damaged by such as the peeling off, cracking, and others.

SUMMARY OF THE INVENTION

Therefore, it is an object of the present invention to provide a linear bearing for heavy load use which adopts rollers as the rolling elements in order to prevent the peeling off, cracking, and other damages from taking place by the heavy load to be applied.

The linear bearing for heavy load use of the present invention comprises an outer cylinder provided with the inner surface having a constant distance R from the center as its radius of curvature; an inner cylinder provided with a plurality of grooves having the same radius of curvature dimensioned as the aforesaid radius of curvature R and extending in the axial direction at the same pitch on the entire circumference of the outer surface opposite to the inner surface of the outer cylinder; and a plurality of barrel shaped rollers having the curved surface on the outer circumference with the same radius of curvature dimensioned as the aforesaid radius of curvature R and arranged in the axial direction and inserted between the aforesaid inner surface and each of the aforesaid grooves.

Since the rolling elements are the barrel shaped rollers, there is constituted linear contacts between these rollers and the raceways of the inner and outer cylinders having the same radius of curvature dimensioned as the radius of curvature of the outer circumference of each of the barrel shaped rollers. Therefore, compared to the point contacts, the contact pressure is significantly reduced to provide a considerable ability of load resistance.

The raceway of the outer cylinder has a circular section simply configured by the inner surface of the outer cylinder. Consequently, the rotation is allowable in the circumferential direction of the outer cylinder, hence making it possible to freely adjust the phase of the outer cylinder with respect to the roller grooves in the inner cylinder. Even if the outer cylinder is inclined, the raceway of the outer cylinder and the rollers can maintain the normal contact at all times, and the centering is automatically corrected with respect to the installation errors. It is also easy to machine the raceway of the outer cylinder.

DETAILED DESCRIPTION OF THE PREFERRED EMBODIMENTS

Hereinafter, with reference to the accompanying drawings the description will be made of the embodiments according to the present invention.

Figure 1:
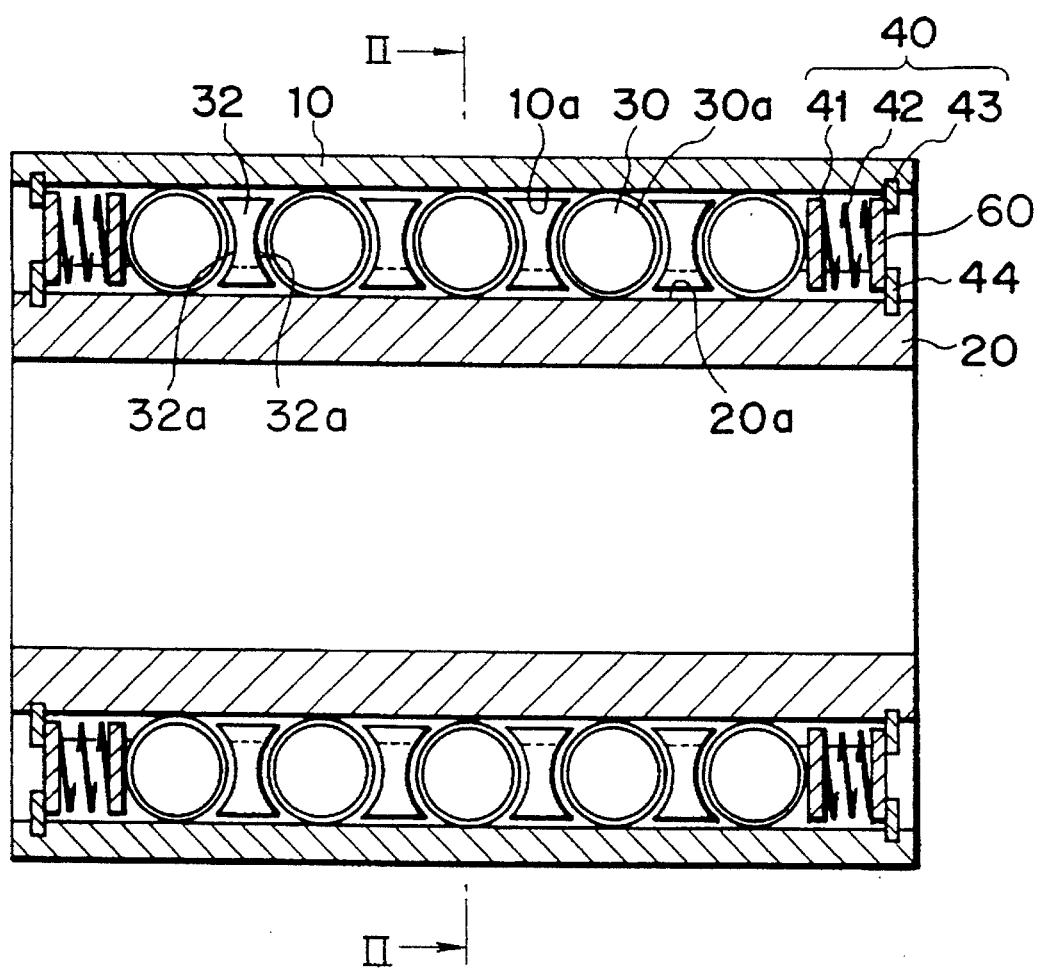
FIG. 1 is a vertically cross-sectional view showing one embodiment according to the present invention.
Figure 2:
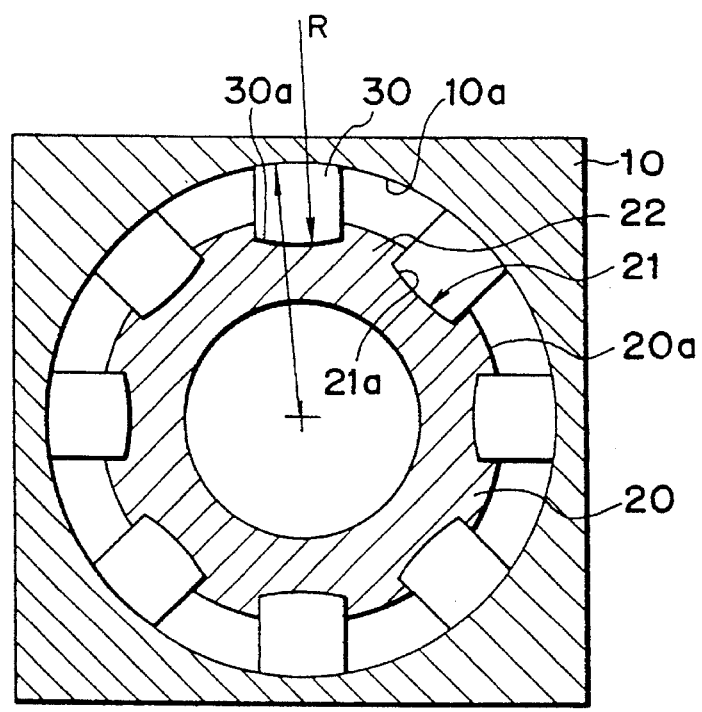
FIG. 2 is a cross-sectional view taken along line II—II in FIG. 1.

FIG. 1 and FIG. 2 are showing one embodiment according to the present invention. FIG. 1 is a vertically cross-sectional view showing a linear bearing. FIG. 2 is a cross-sectional view of the linear bearing taken along line II—II in FIG. 1.

Now, at first, the structure will be described. As rolling elements, barrel shaped rollers 30 are inserted between an outer cylinder 10 and an inner cylinder 20.

The inner surface 10a of the outer cylinder 10 is a simple cylindrical surface having a radius R. Substantially the entire surface thereof functions as the raceway. The external configuration of the outer cylinder 10 is rectangular for the one represented in FIG. 2. However, any other configuration may be adoptable arbitrarily.

The inner cylinder 20 is cylindrical. The outer circumference 20a thereof is opposite to the inner surface 10a of the outer cylinder 10. On the outer circumference 20a, a plurality of arrays of grooves 21 extending in the axial direction are arranged at the same pitch in the circumference. The bottom 21a of each groove 21 is arranged to be the inner cylinder raceway having a concavely curved configuration. The radius of the curvature thereof has the same dimension R as the radius R of the inner surface 10a of the outer cylinder. On both sides of each groove 21, collars 22 are formed.

Figure 3:
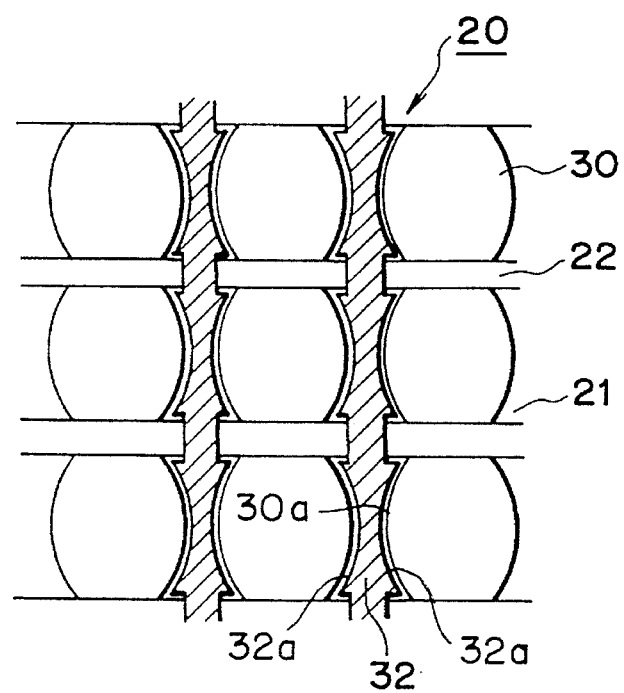
FIG. 3 is a partial enlargement illustrating an example of the separator variation.

The radius of curvature of the circumferential curve 30a of the barrel shaped roller 30 is equally dimensioned in the axial direction to each radius of curvatures R of the inner surface 10a of the outer cylinder and the bottom 21a of the groove 21 of the inner cylinder. The barrel shaped roller 30 is loosely fitted into the groove 21 and it can roll in the groove 21 of the inner cylinder. Plural numbers of rollers (five in FIG. 1) are arranged in each of the grooves 21 at constant intervals through separators 32 in the axial direction. In this respect, both sides 32a of the separator 32 facing the barrel shaped rollers 30 may be planar, or concaved and curved plane coincident with the convex-configured surface of the curved circumference 30a of the rollers. The separators 32 are installed in each of the grooves 21 of the inner cylinder, respectively. Also, the separators may be independently arranged in the circumferential direction or as shown in FIG. 3, the separators may be coupled in the circumferential direction.

In this respect, according to the present embodiment, the radius of curvatures of the groove 21 and the circumferential curve 30a are equally dimensioned to the radius of curvature R of the inner surface 10a. Here, the same dimension referred to is not necessarily the same in its strict sense, but includes substantially the same range.

On both ends of the linear bearing in the axial direction, there is provided a device 40 for positioning in the axial direction of each roller column formed by a plurality of barrel shaped rollers 30, respectively. This positioning device 40 comprises a roller-pusher disc 41 having a diameter slightly smaller than that of the roller, a spring 42 which elastically presses the disc, and a spring washer 60. The positioning device 40 is fixed by a stop ring (for a hole) 43 fixed to the inner surface 10a of the outer cylinder 10 and a stop ring (for a shaft) 44 fixed to the outer peripheral surface 20a of the inner cylinder 20, both stop rings 43 and 44 are mounted on an end of each groove 21 of the inner cylinder.

Now, the function will be described. The outer peripheral curve 30a of the barrel shaped roller 30 is in linear contact with the inner surface 10a (outer cylinder raceway) of the outer cylinder 10 and the bottom face 21a (inner cylinder raceway) of the inner cylinder 20 having the radius of curvatures equally dimensioned to the radius of curvature R of the roller. As a result, the contact pressure is significantly reduced as compared to the conventional case where the point contact is adopted, thus providing a large capacity of load resistance. Consequently, the raceway is scarcely peeled off, cracked, and other damaged even when a large load or a shock load is applied.

The outer cylinder raceway is the inner surface 10a of the outer cylinder having a simple circular sectional configuration to make its machining extremely easy. Also, there is no need to adjust the phase of the outer cylinder to adjust its phase with respect to the grooves 21 of the inner cylinder 20. Therefore, the assembling is also simple.

Further, even when the outer cylinder 10 is rotated or inclined in the circumferential direction, the barrel shaped rollers 30 and the raceway of the outer cylinder are always maintained in a normal contact, and even if there is an installation error, the centering is automatically adjusted.

Also, when the barrel shaped rollers 30 roll, the collars 22 of the grooves 21 guide the barrel shaped rollers 30, thus preventing the barrel shaped rollers 30 from being skewed.

The positioning devices 40 elastically press the roller array in each of the groove 21 in the direction toward the axial center direction at all times. Then, if, for example, the inner cylinder 20 installed on a shaft should shift in the axial direction with respect to the outer cylinder 10 fixed to a housing, the positioning devices 40 cause the roller array which is displaced together to return to the center by use of the elastic force of the springs 42.

Figure 4:
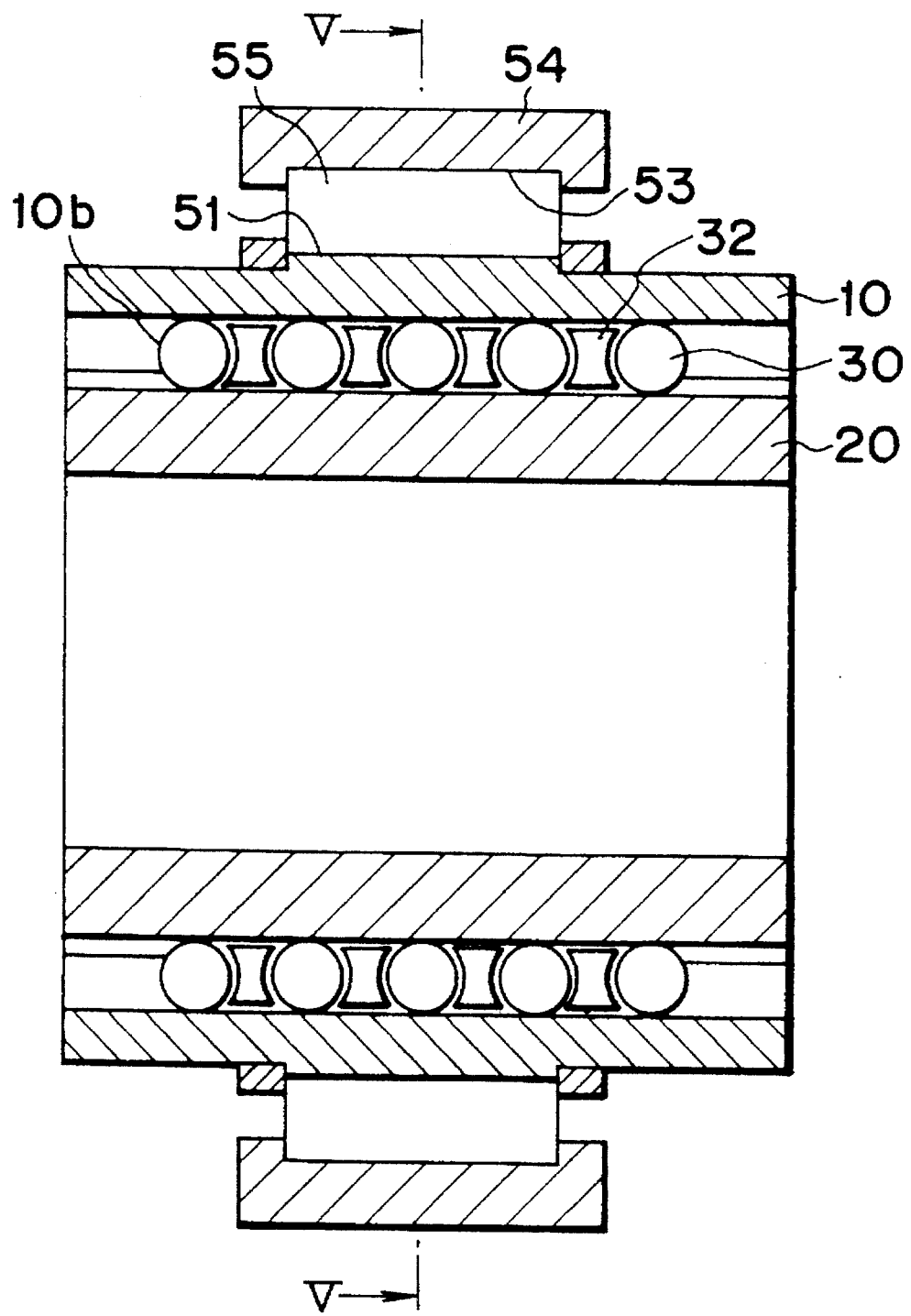
FIG. 4 is a vertically cross-sectional view showing another embodiment according to the present invention.
Figure 5:
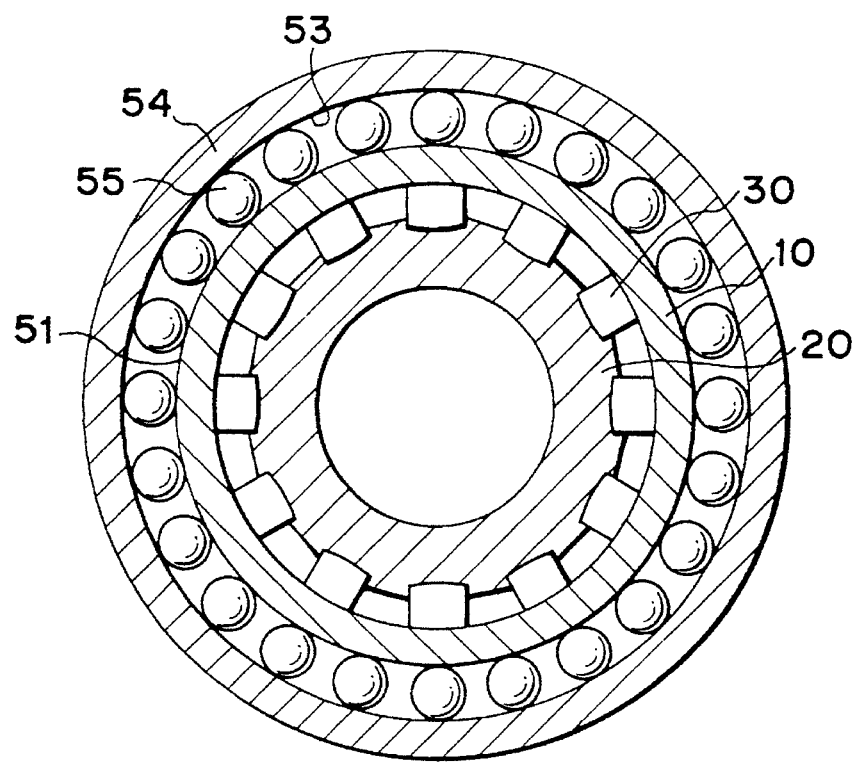
FIG. 5 is a cross-sectional view taken along line V—V.
Figure 6:
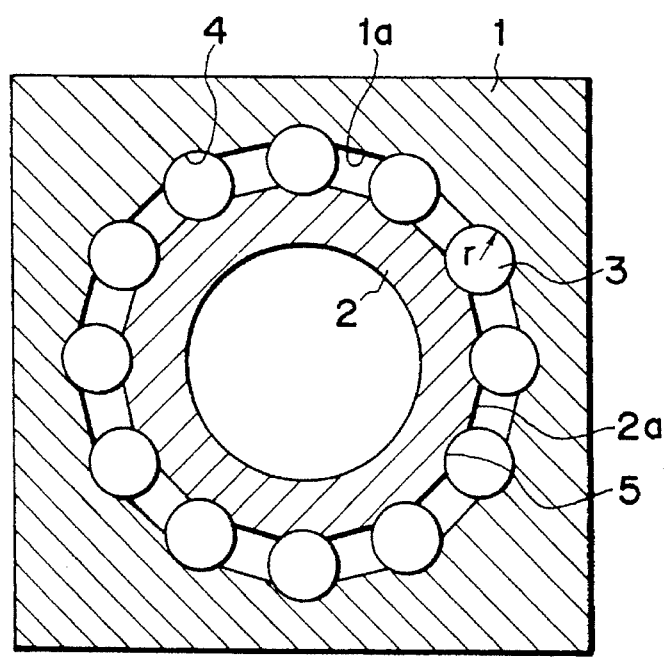
FIG. 6 is a cross-sectional view showing the conventional linear bearing.

FIG. 4 and FIG. 5 are views showing another embodiment according to the present invention.

In this embodiment, a cylindrical roller bearing is combined outside the linear bearing of the first embodiment, which is a barrel shaped roller bearing. Accordingly, the outer cylinder 10 of the barrel shaped roller bearing is cylindrically configured, and at the same time, the inner raceway 51 of the cylindrical roller bearing is formed on the circumference 10b of the outer cylinder 10 of the barrel shaped roller bearing. Then a plurality of cylindrical rollers 55 are inserted between this circumference thus arranged, and the outer ring 54 having the outer raceway 53 opposite to the inner raceway 51.

In this respect, the representation of the positioning devices 40 provided for both ends of the cylindrical roller bearing is omitted in FIG. 4.

In this case, the function of the cylindrical roller bearing is added to the same function of the linear bearing as described above.

As set forth above, according to the present invention, the linear bearing comprises an outer cylinder provided with an inner surface having a constant radius of curvature; an inner cylinder provided with a plurality of grooves extending in the axial direction at the same pitch in the circumferential direction, each having the same radius of curvature as the aforesaid radius of curvature on the circumferential surface opposite to the inner surface of the outer cylinder, and arranged together with collars between each of the grooves; and a plurality of barrel shaped rollers having the circumferential curve of the same radius of curvature as the aforesaid radius of curvature, and being inserted between the aforesaid inner surface and each of the grooves, and arranged in the axial direction so that the rollers are guided by the aforesaid collars to roll. As a result, the barrel shaped rollers and inner and outer raceways constitute linear contacts to enhance the load resistance capability, hence making it possible to effectively prevent the peeling off, cracking, and other damages from being caused by the heavy load to be applied.

Also, since the raceway of the outer cylinder has a simple circular sectional configuration, there is an effect that not only it is easy to machine the surface, but also, it is unnecessary to adjust the phase of the outer cylinder with respect to the roller grooves on the inner cylinder. The assembling is also easy, accordingly.

What is claimed is:

1. A linear bearing for heavy load use comprising:

an outer cylinder provided with an inner surface having a specific radius of curvature;

an inner cylinder provided with a plurality of grooves having the same radius of curvature as said specific radius of curvature on the outer circumference opposite to said inner surface of the outer cylinder and extending in an axial direction at the same pitch in the circumferential direction, said inner cylinder being provided with collars beside each of said grooves; and a plurality of barrel shaped rollers having curved circumference of the same radius of curvature as said specific radius of curvature, being inserted in the axial direction between said inner surface and each of said grooves, and guided by said collars to roll.

2. A linear bearing for heavy load use according to claim 1, wherein said outer cylinder has an inner raceway on the outer circumference thereof, and is provided with an outer ring having an outer raceway opposite to said inner raceway, and a plurality of rolling elements are arranged between said raceways.

\* \* \* \* \*